Figures 1, 2, 3:
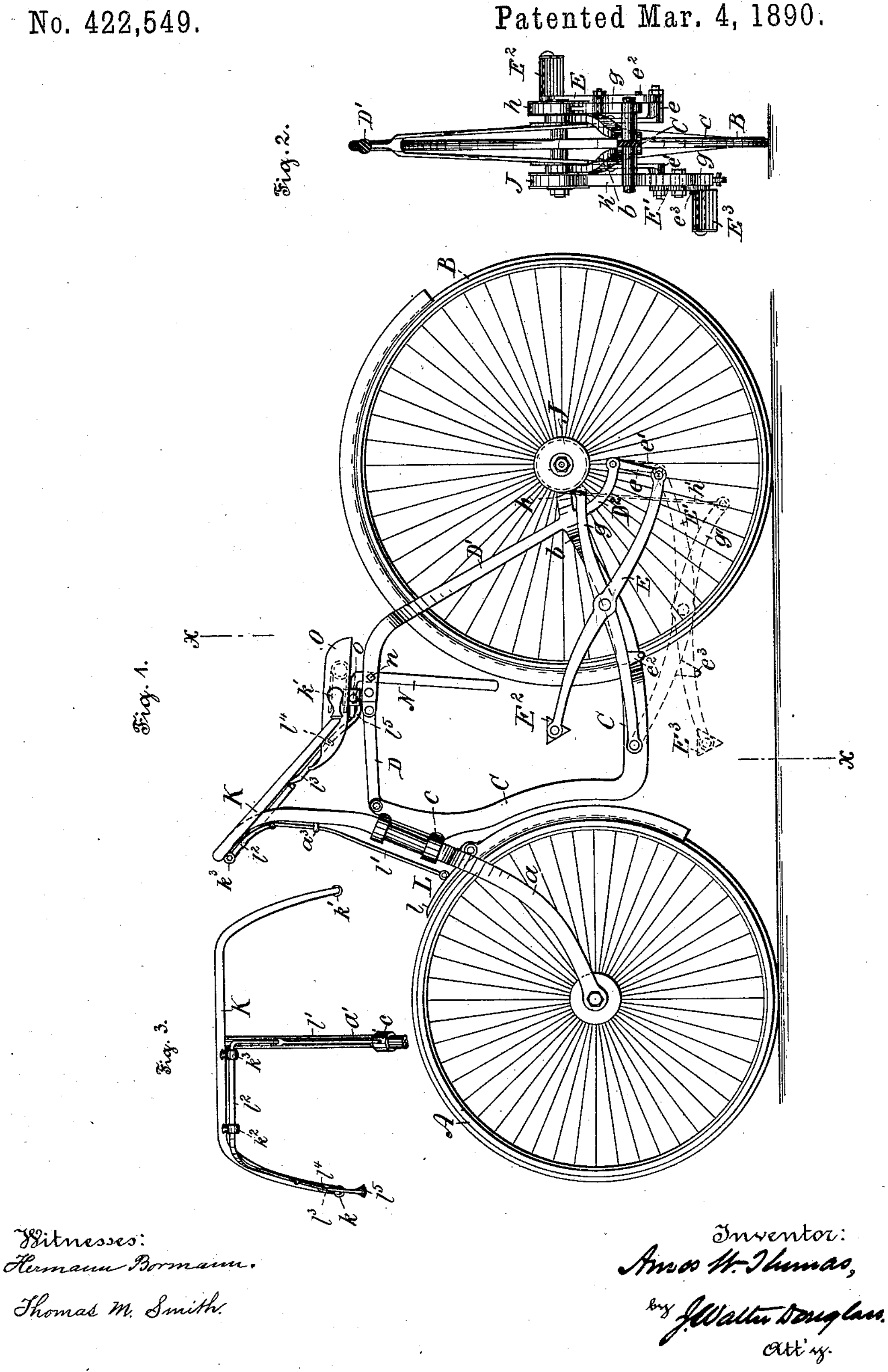

(No Model.)

A. W. THOMAS.

BICYCLE.

No. 422,549. Patented Mar. 4, 1890.

Witnesses:
Hermann Bormann.
Thomas M. Smith.

Inventor:
Amos W. Thomas,
by J. Walter Douglass.
Att'y.

N. PETERS, Photo-Lithographer, Washington, D.C.

UNITED STATES PATENT OFFICE.

AMOS WORTHINGTON THOMAS, OF PHILADELPHIA, PENNSYLVANIA.

BICYCLE.

SPECIFICATION forming part of Letters Patent No. 422,549, dated March 4, 1890.

Application filed March 29, 1889. Serial No. 305,303. (No model.)

*To all whom it may concern:*

Be it known that I, AMOS WORTHINGTON THOMAS, a citizen of the United States, residing at the city of Philadelphia, in the county of Philadelphia and State of Pennsylvania, have invented certain new and useful Improvements in Bicycles and other Vehicles, of which the following is a specification.

My present invention is primarily applicable to bicycles of the type designated as "Safety" machines, provided with two road-wheels of approximately the same size and diameter, and in which the feet of the rider are always in close proximity to the ground.

The principal objects of my invention are, first, to provide a Safety bicycle having a front pilot or steering wheel and a rear driving-wheel with compound levers having pedals and the said levers actuating mechanism for propelling the driving-wheel; second, to provide the vehicle with a saddle capable of both longitudinal and vertical adjustment; third, to provide the vehicle with a handle-bar extending outward from its axis or that of the steering-head and curving then rearward and sloping downward to the saddle, whereby while the rider is mounted on the saddle or standing erect with his feet in engagement with the pedals the handle-bars may be caused to assume a position to partially encircle him, yet at the same time the handle-bar so disposed as to be maintained substantially above the pedals of the compound actuating-levers, and, fourth, to provide an improved braking device operated from one of the handles, whereby the speed as well as stopping the vehicle may be readily effected.

The nature and characteristic features of my invention will be more particularly understood taken in connection with the accompanying drawings, forming part hereof, and in which—

Figure 1 is a side elevation of a bicycle embodying the characteristic features of my invention. Fig. 2 is a vertical transverse section on the line $x$ $x$ of Fig. 1; and Fig. 3 is a rear elevation of the handle-bar, braking device, and a portion of the steering-head.

Referring to the drawings, A is the steering or pilot wheel, and B is the driving-wheel. $a$ are the front forks, which terminate, as usual, in the steering-head $a'$, of any preferred construction.

C is the main frame, provided with a loose sleeve $c$, which surrounds or encircles the steering-head $a'$. From the base of the sleeve $c$ the main frame follows the curvature of the pilot-wheel A to some little distance above the ground, where it curves rearwardly, terminating in a fork $b$, which straddles the driving-wheel B and is suitably attached to the hub thereof. The upper extremity of the main frame has hinged to it a horizontal extension D, which terminates in a depending fork D′, straddling the driving-wheel B, and is secured to the rear forked extension of said main frame attached to the hub of the driving-wheel B. Beneath the depending fork D′ are secured to the rear forked portion of the main frame C two curved arms $D^2$, to the lower extremities of which and the pedal-levers E and E′ are pivotally attached links $e$ and $e'$, and the forward extremities of these oscillating pedal-levers E and E′ terminate in foot-pieces $E^2$ and $E^3$, of any preferred construction.

Centrally to the pedal-levers E and E′ are fulcrumed oscillating levers $g$ and $g'$, which are pivoted at their front extremities to the main frame C and at their rear extremities to chains or straps $h$ and $h'$, of leather or other suitable material, which are in engagement with independent clutches J, applied to the hub of the driving-wheel B. These clutches may be of any construction; but preference is given to a clutch forming the subject-matter of an application for a patent filed by me in the Patent Office under date of June 12, 1888, and serially numbered 276,839.

The oscillating levers $g$ and $g'$ are provided with suitable stops $e^2$ and $e^3$, to limit the downward movement of the pedal-levers E and E′.

K is the handle-bar, fitted to or formed integral with the steering-head $a'$. This handle-bar K extends laterally from each side of its axis or center and curves thence rearwardly in a slanting direction to a point substantially midway of the length of the saddle, where it terminates in handles $k$ and $k'$, curving slightly upward—for instance, as illustrated in Fig. 1. By this construction of handle-bar the occupant of the vehicle, while the same is pursuing a forward course, is permitted to stand erect on the pedals and to both pull and bear, thereby insuring the greatest amount of power being exerted, and in rounding sharp curves one of the handles will assume a position partially encircling the rider; but in any position of this bar the handles are practically in a direct line beneath the arms of the rider, straightened in the direction of the saddle, so that absolute control of the vehicle is insured for propelling as well as steering the vehicle.

L is a braking device connected with one portion of the handle-bar K. This braking device consists of a shoe $l$, conforming to the curvature of the pilot-wheel A, and provided with an eye, to which is pivotally attached a vertical rod $l'$, extending from the braking device L of the pilot-wheel A between a guide $a^3$, formed with or secured to the upper part of the steering-head $a'$. The upper part of the rod $l'$ is hinged to a right-angular rod $l^2$, the outer portion of which is passed through eyes $k^2$ and $k^3$, secured to or formed integral with the handle-bar K. The outer portion of the rod $l^2$ is made to conform to the curvature of the handle-bar K. This rod $l^2$ is then pivotally attached to a rocking lever $l^3$, which is hinged to a projection $l^4$, secured to or cast with said handle-bar, and this rocking lever $l^3$ is provided with a handle $l^5$, by the compression of which the rods $l'$, $l^2$, and $l^3$ are actuated and the brake-shoe adjacent to the pilot-wheel A is brought into engagement therewith, and the speed of the vehicle regulated or stopped by the degree of pressure exerted against the rocking lever $l^3$ by the hand of the rider.

N is an angular-shaped support projecting downward through an opening in the horizontal extension D' of the main frame C. This support may be held to place by means of a tightening-screw $n$. O is a saddle of any suitable construction mounted on this support and held to place by means of a screw $o$.

It will be observed that the saddle and support therefor arranged in the manner just described may be readily adjusted both vertically and longitudinally as occasion may require.

It may be remarked that as to many of the details of mechanical construction alterations may be made without departing from the spirit of the invention, and it is also obvious that many of the devices hereinbefore described are capable of being adapted for use in connection with tricycles, four-wheeled velocipedes, and other vehicles.

Having thus described the nature and objects of my invention, what I claim as new, and desire to secure by Letters Patent, is—

1. The combination, with a bicycle or other vehicle having pilot and driving wheels and a frame, of clutches applied to the driving-wheel, levers fulcrumed to said frame, straps connected with said levers, and pedal-levers pivoted to said levers and to links connected with said frame, substantially as and for the purposes set forth.

2. The combination, with a bicycle or other vehicle having pilot and driving wheels and a frame connected at one end to the steering-head of the pilot-wheel and at the opposite end to the driving-wheel, of clutches applied to the said driving-wheel, flexible straps in connection with said clutches, levers fulcrumed to said frame, and pedal-levers pivoted to said levers, substantially as and for the purposes set forth.

3. The combination, with a bicycle or other vehicle having a main frame, of levers fulcrumed thereto and actuating the driving-wheel, and pedal-levers pivotally connected by links to said frame and connected axially to said fulcrumed levers, substantially as and for the purposes set forth.

4. The combination, in a bicycle or other vehicle, of levers connected with a frame and the driving-wheel and pedal-levers pivoted to said levers, substantially as and for the purposes set forth.

5. The combination, in a bicycle or other vehicle, with pilot and driving wheels, a frame, levers fulcrumed thereto and actuating said driving-wheel, and pedal-levers pivotally connected with said frame and levers, of a steering-bar extending outward from the axis of the steering-head of the pilot-wheel and then downward, terminating in upward-curving handles, substantially as described.

6. The combination, in a bicycle or other vehicle, with pilot and driving wheels, a frame, levers fulcrumed to said frame to actuate said driving-wheel, and pedal-levers pivotally connected with said frame and levers, of a steering-head straddling said pilot-wheel and provided with a steering-bar extending outward from each side thereof and curving downward to a saddle capable of vertical and longitudinal adjustment, and a braking device connected with one of the handles of said bar, substantially as shown and described, and for the purposes set forth.

7. The combination, with a bicycle or other vehicle having a pilot-wheel and a driving-wheel, of a steering-head straddling said pilot-wheel and provided with handles extending outward from each side of said head and curving downward to midway of the length of a saddle adjustably supported by a hinged frame pivotally connected with said steering-head and secured to the hub of said driving-wheel, clutches applied to the hub of said driving-wheel, levers fulcrumed to said main frame, flexible connections between said clutches and said levers, and pedal-levers pivotally connected with said fulcrumed levers, substantially as and for the purposes set forth.

8. The combination, in a bicycle or other vehicle, of levers for actuating the driving-wheel, pedal-levers pivotally connected with said levers, and stops applied to said levers to limit the downward movement of said pedal-levers, substantially as described.

9. The combination, in a bicycle or other vehicle, of levers connected with the frame of the vehicle and actuating-clutches applied to the driving-wheel thereof, pedal-levers pivoted to links connected with said frame, and stops to limit the extent of movement of the clutch-actuating levers, substantially as and for the purposes set forth.

10. The combination, in a bicycle or other vehicle, with levers connected with a frame and actuating-clutches applied to the driving-wheel of the vehicle and pedal-levers pivoted to said levers and to links connected with said frame, of a steering-bar extending outward from both sides of the steering-head, and a braking device with a shoe and a pivotal lever for operating the same from one of the handles of said steering-bar, substantially as and for the purposes set forth.

In witness that I claim the foregoing as my invention I have hereunder set my signature in the presence of two subscribing witnesses.

AMOS WORTHINGTON THOMAS.

Witnesses:

THOMAS M. SMITH,

J. WALTER DOUGLASS.